(12) United States Patent
Kennedy, III et al.

(10) Patent No.: US 7,612,134 B2
(45) Date of Patent: *Nov. 3, 2009

(54) GOLF BALL AND THERMOPLASTIC MATERIAL

(75) Inventors: Thomas J. Kennedy, III, Wilbraham, MA (US); Mark L. Binette, Ludlow, MA (US)

(73) Assignee: Callaway Golf Company, Carlsbad, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 11/276,223

(22) Filed: Feb. 17, 2006

(65) Prior Publication Data

US 2006/0106145 A1    May 18, 2006

Related U.S. Application Data

(63) Continuation-in-part of application No. 11/065,217, filed on Feb. 23, 2005, now Pat. No. 7,312,267.

(51) Int. Cl.
*C08L 33/02* (2006.01)
*C08L 23/08* (2006.01)
*C08K 5/09* (2006.01)
*A63B 37/00* (2006.01)

(52) U.S. Cl. .................. 524/322; 524/394; 524/397; 524/399; 524/400; 525/193; 525/201; 525/221; 473/372; 473/373; 473/385

(58) Field of Classification Search .................. None
See application file for complete search history.

(56) References Cited

U.S. PATENT DOCUMENTS

| | | | |
|---|---|---|---|
| 2,549,935 A | 4/1951 | Sauer |
| 2,598,283 A | 5/1952 | Miller |
| 2,946,763 A | 7/1960 | Bro et al |
| 3,013,967 A | 12/1961 | Rulon-Miller et al |
| 3,051,683 A | 8/1962 | Mallouk |
| 3,125,547 A | 3/1964 | Blatz |
| 3,132,124 A | 5/1964 | Couture et al |
| 3,196,194 A | 7/1965 | Ely, Jr. et al |
| 3,231,635 A | 1/1966 | Holden et al |
| 3,264,272 A | 8/1966 | Rees |
| 3,265,092 A | 8/1966 | Ely, Jr. et al |
| 3,265,622 A | 8/1966 | Anderson |
| 3,278,495 A | 10/1966 | Hagel et al |
| 3,365,520 A | 1/1968 | Foster |
| 3,384,612 A | 5/1968 | Brandt et al. |
| 3,404,134 A | 10/1968 | Rees |
| 3,454,282 A | 7/1969 | Harrison et al |
| 3,461,129 A | 8/1969 | Middleton |
| 3,481,908 A | 12/1969 | Mortimer |
| 3,503,945 A | 3/1970 | Kim |
| 3,505,301 A | 4/1970 | Natta et al |
| 3,573,125 A | 3/1971 | Elliott |
| 3,645,992 A | 2/1972 | Elston |
| 3,649,578 A | 3/1972 | Bush |
| 3,671,477 A | 6/1972 | Nesbitt |
| 3,769,252 A | 10/1973 | Fujii et al |
| 3,789,035 A | 1/1974 | Iwami et al |
| 3,819,768 A | 6/1974 | Molitor |
| 3,823,108 A | 7/1974 | Bissot |
| 3,847,854 A | 11/1974 | Canter |
| 3,870,841 A | 3/1975 | Makowski et al |
| 3,904,575 A | 9/1975 | Satokawa et al |
| 3,927,137 A | 12/1975 | Bryson |
| 4,001,195 A | 1/1977 | Wyatt |
| 4,075,362 A | 2/1978 | Concannon |
| 4,122,248 A | 10/1978 | Pfleger et al. |
| 4,123,602 A | 10/1978 | Ukihashi et al. |
| 4,150,208 A | 4/1979 | Hwang |
| 4,172,859 A | 10/1979 | Epstein |
| 4,173,345 A | 11/1979 | Pocklington |
| 4,174,358 A | 11/1979 | Epstein |
| 4,238,376 A | 12/1980 | Wilson |
| 4,264,075 A | 4/1981 | Miller |
| 4,299,744 A | 11/1981 | Stewart |
| 4,302,554 A | 11/1981 | Nabeta et al. |
| 4,310,638 A | 1/1982 | Coran et al. |
| 4,338,413 A | 7/1982 | Coran et al. |
| 4,346,194 A | 8/1982 | Roura |
| 4,351,931 A | 9/1982 | Armitage |
| 4,359,561 A | 11/1982 | Fraser et al. |
| 4,360,488 A | 11/1982 | Barham et al. |
| 4,380,618 A | 4/1983 | Khan et al. |
| 4,381,384 A | 4/1983 | Khan |
| 4,404,325 A | 9/1983 | Mason et al. |
| 4,424,330 A | 1/1984 | Raviola |
| 4,431,193 A | 2/1984 | Nesbitt |
| 4,479,989 A | 10/1984 | Mahal |
| 4,506,061 A | 3/1985 | Makino et al. |
| 4,509,821 A | 4/1985 | Stenger |
| 4,517,340 A | 5/1985 | Read et al. |
| 4,526,375 A | 7/1985 | Nakade |
| 4,528,329 A | 7/1985 | Inoue et al. |
| 4,550,130 A | 10/1985 | Kishida et al. |

(Continued)

*Primary Examiner*—David Buttner
(74) *Attorney, Agent, or Firm*—Michael A. Catania; Elaine H. Lo

(57) ABSTRACT

Disclosed herein are a novel thermoplastic material and a golf ball utilizing the thermoplastic material of the invention. The golf ball (10) preferably comprises a core (12), a cover (16) and, optionally, a boundary layer (14). At least one of the core (12), cover (16) or boundary layer (14) of the golf ball (10) comprises a thermoplastic material according to the invention. A thermoplastic material of the invention comprises a partially to highly neutralized blend of an acid copolymer, a copolymer comprising a metallocene-catalyzed alpha-olefin and a softening comonomer, and a fatty acid or fatty acid salt.

4 Claims, 1 Drawing Sheet

U.S. PATENT DOCUMENTS

| | | |
|---|---|---|
| 4,552,925 A | 11/1985 | Nakagawa et al. |
| 4,555,546 A | 11/1985 | Patel |
| 4,567,219 A | 1/1986 | Tominaga |
| 4,579,918 A | 4/1986 | Metzger et al. |
| 4,591,611 A | 5/1986 | Jenkins et al. |
| 4,595,730 A | 6/1986 | Blondel |
| 4,602,058 A | 7/1986 | Graham et al. |
| 4,668,752 A | 5/1987 | Tomenari et al. |
| 4,675,380 A | 6/1987 | Buckmaster et al. |
| 4,679,795 A | 7/1987 | Melvin et al. |
| 4,690,981 A | 9/1987 | Statz |
| 4,694,042 A | 9/1987 | McKee |
| 4,720,516 A | 1/1988 | Kishida et al. |
| 4,742,122 A | 5/1988 | Buckmaster et al. |
| 4,748,206 A | 5/1988 | Nogiwa et al. |
| 4,749,752 A | 6/1988 | Youlu et al. |
| 4,761,328 A | 8/1988 | Shin |
| 4,774,290 A | 9/1988 | Neill et al. |
| 4,788,265 A | 11/1988 | Pfleger et al. |
| 4,789,717 A | 12/1988 | Giannetti et al. |
| 4,801,649 A | 1/1989 | Statz |
| 4,835,218 A | 5/1989 | Yoshimura et al. |
| 4,848,770 A | 7/1989 | Shama |
| 4,857,611 A | 8/1989 | Durand et al. |
| 4,858,924 A | 8/1989 | Saito et al. |
| 4,864,006 A | 9/1989 | Giannetti et al. |
| 4,884,814 A | 12/1989 | Sullivan |
| 4,902,456 A | 2/1990 | Yen et al. |
| 4,904,735 A | 2/1990 | Chapman, Jr. et al. |
| 4,911,451 A | 3/1990 | Sullivan et al. |
| 4,919,434 A | 4/1990 | Saito |
| 4,955,966 A | 9/1990 | Yuki et al. |
| 4,956,414 A | 9/1990 | Muehlenbernd et al. |
| 4,984,804 A | 1/1991 | Yamada et al. |
| 4,990,574 A | 2/1991 | Yamada |
| 5,000,459 A | 3/1991 | Isaac |
| 5,068,151 A | 11/1991 | Nakamura |
| 5,087,680 A | 2/1992 | Duan et al. |
| 5,091,471 A | 2/1992 | Graves et al. |
| 5,093,422 A | 3/1992 | Himes |
| 5,096,201 A | 3/1992 | Egashira et al. |
| 5,106,911 A | 4/1992 | Chapman, Jr. et al. |
| 5,120,791 A | 6/1992 | Sullivan |
| 5,134,209 A | 7/1992 | Job et al. |
| 5,155,157 A | 10/1992 | Statz et al. |
| 5,197,740 A | 3/1993 | Pocklington |
| 5,198,511 A | 3/1993 | Brown-Wensley et al. |
| 5,204,429 A | 4/1993 | Kaminsky et al. |
| 5,208,309 A | 5/1993 | McDaniel et al. |
| 5,209,485 A | 5/1993 | Nesbitt |
| 5,216,074 A | 6/1993 | Imai et al. |
| 5,218,057 A | 6/1993 | Kurkov et al. |
| 5,218,071 A | 6/1993 | Tsutsui et al. |
| 5,244,969 A | 9/1993 | Yamada |
| 5,250,612 A | 10/1993 | Hazlitt et al. |
| 5,260,126 A | 11/1993 | Collier, IV et al. |
| 5,266,639 A | 11/1993 | Chapman, Jr. et al. |
| 5,272,236 A | 12/1993 | Lai et al. |
| 5,274,041 A | 12/1993 | Yamada |
| 5,278,272 A | 1/1994 | Lai et al. |
| 5,281,651 A | 1/1994 | Arjunan et al. |
| 5,298,571 A | 3/1994 | Statz et al. |
| 5,306,760 A | 4/1994 | Sullivan |
| 5,312,857 A | 5/1994 | Sullivan |
| 5,318,849 A | 6/1994 | Mehalla et al. |
| 5,321,089 A | 6/1994 | Cadorniga et al. |
| 5,340,840 A | 8/1994 | Park et al. |
| 5,397,829 A | 3/1995 | Morgan et al. |
| 5,397,840 A | 3/1995 | Sullivan et al. |
| 5,415,937 A | 5/1995 | Cadorniga et al. |
| 5,464,904 A | 11/1995 | Chapman, Jr. et al. |
| 5,475,075 A | 12/1995 | Brant et al. |
| 5,492,971 A | 2/1996 | Williams |
| 5,492,972 A | 2/1996 | Stefani |
| 5,508,350 A | 4/1996 | Cadorniga et al. |
| 5,508,351 A | 4/1996 | Horiuchi et al. |
| 5,516,847 A | 5/1996 | Sullivan et al. |
| 5,542,677 A | 8/1996 | Sullivan et al. |
| 5,565,521 A | 10/1996 | Effler et al. |
| 5,688,191 A | 11/1997 | Cavallaro et al. |
| 5,688,869 A | 11/1997 | Sullivan |
| 5,691,418 A | 11/1997 | Hagman et al. |
| 5,789,475 A | 8/1998 | Chen |
| 5,803,831 A | 9/1998 | Sullivan et al. |
| 5,816,944 A | 10/1998 | Asakura et al. |
| 5,836,834 A | 11/1998 | Masutani et al. |
| 5,866,663 A | 2/1999 | Brookhart et al. |
| 5,880,241 A | 3/1999 | Brookhart et al. |
| 5,880,323 A | 3/1999 | Brookhart et al. |
| 5,886,224 A | 3/1999 | Brookhart et al. |
| 5,891,963 A | 4/1999 | Brookhart et al. |
| 5,895,105 A | 4/1999 | Nesbitt |
| 5,902,855 A | 5/1999 | Sullivan |
| 5,916,989 A | 6/1999 | Brookhart et al. |
| 5,942,461 A | 8/1999 | Brown et al. |
| 5,973,046 A | 10/1999 | Chen et al. |
| 6,034,259 A | 3/2000 | Brookhart et al. |
| 6,071,201 A | 6/2000 | Maruko |
| 6,083,119 A | 7/2000 | Sullivan et al. |
| 6,100,321 A | 8/2000 | Chen |
| 6,100,340 A | 8/2000 | Rajagopalan et al. |
| 6,107,422 A | 8/2000 | Wang et al. |
| 6,140,439 A | 10/2000 | Brookhart et al. |
| 6,254,495 B1 | 7/2001 | Nakamura et al. |
| 6,290,612 B1 | 9/2001 | Maruko et al. |
| 6,306,049 B1 | 10/2001 | Rajagopalan |
| 6,329,458 B1 | 12/2001 | Takesue et al. |
| 6,431,998 B1 | 8/2002 | Nakamura et al. |
| 6,485,378 B1 | 11/2002 | Boehm |
| 6,562,906 B2 | 5/2003 | Chen |
| 6,565,455 B2 | 5/2003 | Hayashi et al. |
| 6,595,874 B2 | 7/2003 | Sullivan et al. |
| 6,613,842 B2 | 9/2003 | Rajagopalan |
| 6,653,382 B1 | 11/2003 | Statz |
| 7,312,267 B2 * | 12/2007 | Kennedy |
| 2002/0091188 A1 * | 7/2002 | Statz |
| 2002/0099120 A1 * | 7/2002 | Takesue |
| 2003/0013549 A1 * | 1/2003 | Rajagopalan |
| 2008/0058451 A1 * | 3/2008 | Kennedy |

* cited by examiner

GOLF BALL AND THERMOPLASTIC MATERIAL

CROSS REFERENCES TO RELATED APPLICATIONS

The Present application is a continuation-in-part application of U.S. patent application Ser. No. 11/065,217, which was filed on Feb. 23, 2005, now U.S. Pat. No. 7,312,267.

STATEMENT REGARDING FEDERALLY SPONSORED RESEARCH OR DEVELOPMENT

Not Applicable

BACKGROUND OF THE INVENTION

1. Field of the Invention

The present invention relates to a thermoplastic material, a process for producing the thermoplastic material and use of the thermoplastic material in a golf ball.

2. Description of the Related Art

Traditional golf ball covers have been comprised of balata or blends of balata with elastomeric or plastic materials. Balata-related covers, often referred to as soft balata covers, are relatively soft and flexible. Upon impact, soft balata covers compress against the surface of the club producing high spin. Consequently, these soft and flexible covers provide an experienced golfer with the ability to apply a spin to control the ball in flight in order to produce a draw or a fade, or a backspin which causes the ball to "bite" or stop abruptly on contact with the green. Moreover, soft balata covers produce a soft "feel" to the low handicap player. Such playability properties as, workability and feel are particularly important in short iron play with low swing speeds and are exploited significantly by relatively skilled players.

Despite all the benefits of balata, balata-related golf ball covers are easily cut and/or damaged if hit improperly. Golf balls produced with balata or balata-containing cover compositions therefore have a relatively short lifespan. As a result of this negative property, balata and its synthetic substitutes, trans-polybutadiene and trans-polyisoprene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E.I. du Pont de Nemours and Company (DuPont), under the trade name "Surlyn7" (Surlyn7™), and, more recently, by the ExxonMobil Corporation (ExxonMobil) (see, for example, U.S. Pat. No. 4,911,451), under the trade name "Iotek" (Iotek™), have become the materials of choice for the construction of golf ball covers over traditional balata (trans-polyisoprene, natural or synthetic) rubbers.

Ionomeric resins are generally ionic copolymers of an olefin (such as ethylene) and a metal salt of an unsaturated carboxylic acid (such as acrylic acid, methacrylic acid or maleic acid). Metal cations such as sodium or zinc are used to neutralize some portion of the acidic group in the copolymer resulting in a thermoplastic elastomer exhibiting enhanced properties such as durability for golf ball cover construction over balata. However, some of the advantages gained in increased durability have been offset to some degree by decreases produced in playability. This is because although ionomeric resins are very durable, they tend to be very hard when utilized for golf ball cover construction and, thus, lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the feel characteristic associated with the softer balata-related covers.

As a result, while there are many commercial grades of ionomers available both from DuPont and ExxonMobil, with a wide range of properties that vary according to the type and amount of metal cations, molecular weight, composition of the base resin (such as relative content of ethylene and methacrylic and/or acrylic acid groups) and additive ingredients such as reinforcement agents, or the like, a great deal of research continues in order to develop a golf ball cover composition exhibiting not only the improved impact resistance and carrying distance properties produced by the "hard" ionomeric resins, but also the playability (for example, "spin", "feel" and the like) characteristics previously associated with soft balata-related covers, properties that are still desired by the more skilled golfer.

Consequently, a number of golf balls have been produced to address these needs. The different types of materials utilized to formulate the cores, mantles and covers of these balls dramatically alter the balls' overall characteristics. In addition, multi-layered covers containing one or more ionomeric resins have also been formulated in an attempt to produce a golf ball having the overall distance, playability and durability characteristics desired.

Such formulations are described in U.S. Pat. No. 4,431,193 ('193), where a multi-layered golf ball is produced by initially molding a first cover layer on a spherical core and then adding a second layer. The first layer consists of a hard, high flexural modulus resinous material such as Surlyn7™ 8940, a sodium ion based low acid (less than or equal to 16 weight percent methacrylic acid) ionomeric resin having a flexural modulus of about 51,000 psi. An outer layer of a comparatively soft, low flexural modulus resinous material such Surlyn7™ 9020 is molded over the inner cover layer. Surlyn7™ 9020 is a zinc ion based low acid (10 weight percent methacrylic acid) ionomeric resin having a flexural modulus of about 14,000 psi.

The '193 patent also teaches that the hard, high flexural modulus resin, which comprises the first layer, provides for a gain in coefficient of restitution over the coefficient of restitution of the core. The increase in the coefficient of restitution provides a ball that attains or approaches the maximum initial velocity limit of 255 feet per second, as provided by the United States Golf Association (USGA) rules. The relatively soft, low flexural modulus outer layer provides for the advantageous feel and playing characteristics of a balata covered golf ball.

In various attempts to produce a durable, high spin golf ball, the golfing industry has blended the hard ionomeric resins with a number of softer ionomeric resins. For example, U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid and an acrylate ester. However, it has been found that golf ball covers formed from hard-soft ionomer blends tend to become scuffed more readily than covers made of a hard ionomeric resin alone. It would be useful to develop a golf ball having a combination of softness and durability that is better than the softness-durability combination of a golf ball cover made from a hard-soft ionomer blend.

Most professional golfers and good amateur golfers desire a golf ball that provides distance when hit off a driver, control and stopping ability on fall iron shots as well as high spin on short "touch and feel" shots. Many conventional golf balls have undesirable high spin rates on full shots. The excessive spin on fall shots is a sacrifice made in order to achieve more spin on the shorter touch shots. It would be beneficial to provide a golf ball that has high spin for touch shots, without generating excessive spin on fall shots, while maintaining or improving some of the other properties of the golf ball.

BRIEF SUMMARY OF THE INVENTION

The present invention is directed to a novel thermoplastic material and to its use in a golf ball as a core, cover or intermediate layer. The thermoplastic material of the invention includes a blend of two or more copolymers and fatty acids or salts of fatty acids. The material of the invention is partially to highly neutralized (preferably 50 to 100%), and has a greater coefficient of restitution than other thermoplastic materials.

One embodiment of the present invention is a golf ball comprising a core and a cover layer disposed on and, preferably, covering the core, wherein at least one of the cover and the core is formed from the thermoplastic material of the invention. The material of the invention preferably comprises, as part of the blend, (1) a copolymer comprising an alpha olefin and an acid, such as ethylene/acrylic acid (an alpha, beta-unsaturated carboxylic acid) and (2) a copolymer or "plastomer" comprising a metallocene-catalyzed alpha olefin and a softening comonomer. Alternatively, the first copolymer may include an alpha olefin, an acid and a softening comonomer such as an alkyl acrylate (wherein the first copolymer is also referred to as a "terpolymer"). Exemplary softeners for the second copolymer include an alpha olefin such as butene-1, hexene-1, octene-1,4-methyl-1-pentene, etc. Preferably, the second copolymer, or "plastomer," is a metallocene-catalyzed ethylene/alpha olefin copolymer. A thermoplastic material blend of the invention further comprises fatty acids or fatty acid salts. Exemplary fatty acids or fatty acid salts can include metal stearates or stearic acids. Other materials such as metallocene-catalyzed plastomers, urethanes or other materials known in the art may also be used for thermoplastic material blend modification as desired.

In a particularly preferred form of the invention the thermoplastic material of the invention comprises a blend of two or more copolymers, wherein the first copolymer is formed from an alpha olefin having 2 to 8 carbon atoms, and an acid which includes at least one member selected from the group consisting of alpha, beta-ethylenically unsaturated mono- or dicarboxylic acids with a portion of the acid being neutralized with cations, and the second copolymer is formed from an alpha olefin having 2 to 8 carbon atoms, and a softening comonomer. The optional softening comonomer that may be added to the first copolymer is preferably an unsaturated monomer of the acrylate ester class having from 1 to 21 carbon atoms.

Another embodiment of the present invention is a golf ball having a core, boundary layer and cover. The core includes a polybutadiene mixture, has a diameter ranging from 1.35 inches to 1.64 inches and has a PGA compression ranging from 50 to 90. The boundary layer is formed over the core and is composed of a thermoplastic material of the invention. The boundary layer has a thickness ranging from 0.020 to 0.075 inches and a Shore D hardness ranging from 50 to 70 as measured according to standard test method D2240 of the American Society for Testing and Materials (ASTM-D2240).

The cover is formed over the boundary layer. The cover is composed of a fast chemical reaction aliphatic polyurethane material formed from reactants that comprise a polyurethane prepolymer and a polyol. The polyurethane material has a Shore D hardness ranging from 30 to 60 as measured according to ASTM-D2240 and a thickness ranging from 0.015 to 0.044 inches. The polyurethane material of the cover also provides for an aerodynamic surface geometry.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
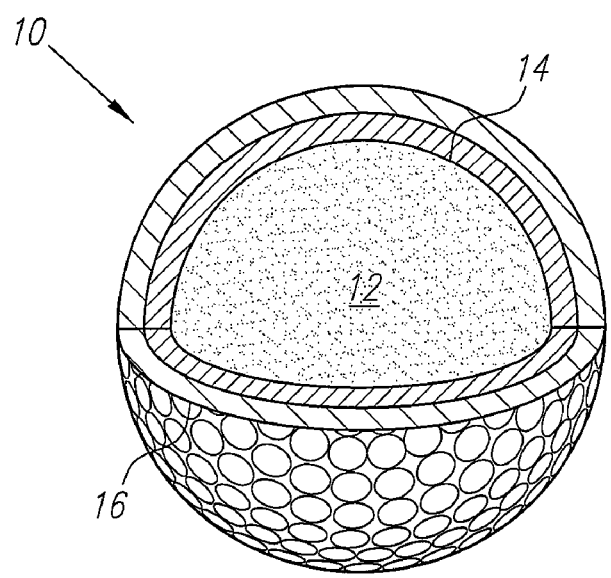
FIG. 1 illustrates a perspective view of a golf ball of the present invention including a cut-away portion showing a core, a boundary layer and a cover.
Figure 2:
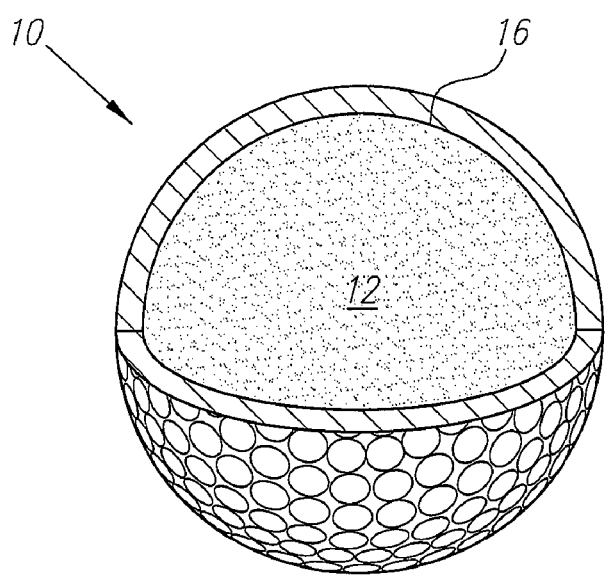
FIG. 2 illustrates a perspective view of a golf ball of the present invention including a cut-away portion showing a core and a cover.

The present invention relates to a novel thermoplastic material and to its use in golf equipment, particularly, a golf ball 10. As shown in FIG. 1, a three-piece solid golf ball comprises a core 12, a boundary 14 and a cover 16. As shown in FIG. 2, a two-piece golf ball comprises a core 12 and a cover 16. At least one of the components of the golf ball comprises a thermoplastic material of the invention.

More particularly, the invention provides a neutralized thermoplastic material comprising a blend of (1) a copolymer comprising an alpha olefin and an alpha, beta-unsaturated carboxylic acid (an acid copolymer referred to as EX), (2) a copolymer or plastomer comprising a metallocene-catalyzed alpha olefin and a softening comonomer, e.g., a metallocene-catalyzed ethylene/alpha olefin copolymer (a metallocene copolymer referred to as EM) and (3) a fatty acid or salt of a fatty acid. The first copolymer may also include a softening comonomer such as an alkyl acrylate, which copolymer (or terpolymer) is referred to as EXY. Other materials including, but not limited to, urethanes, and the like, may be used to modify the blend.

The acid copolymer of a thermoplastic material of the invention may contain anywhere from 1 to 30% by weight acid. A high acid copolymer containing greater than 16% by weight acid, preferably, from about 17 to about 25 weight % acid and, more preferably, about 20 weight % acid, or a low acid copolymer containing 16% by weight acid or less may be used as desired. The acid copolymer is neutralized with a metal cation of a salt (a metal cation salt) capable of ionizing or neutralizing the copolymer to the extent desired, generally from about 10 to 100%, preferably, from 30 to 100% and, more preferably, from 40 to 90%. The amount of metal cation salt needed varies with the extent of neutralization desired.

The acid copolymer is preferably made up of from about 10 to about 30% by weight of an alpha, beta-unsaturated carboxylic acid and an alpha olefin. Optionally, a softening comonomer can be included in the copolymer. Generally, the alpha olefin has from 2 to 10 carbon atoms and is, preferably, ethylene. The unsaturated carboxylic acid is an acid having from about 3 to 8 carbon atoms. Examples of such acids include, but are not limited to, acrylic acid, methacrylic acid, ethacrylic acid, chloroacrylic acid, crotonic acid, maleic acid, fumaric acid and itaconic acid, with acrylic acid and methacrylic acid being preferred. The optional softening comonomer, such as an alkyl acrylate, has, e.g., from 1 to 8 carbon atoms in the alkyl group. The acid copolymer broadly contains from 1 to about 30% by weight unsaturated carboxylic acid, from about 70 to about 99% by weight ethylene and from 0 to about 40% by weight of a softening comonomer.

Examples of acid copolymers suitable for use in a thermoplastic material of the invention include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/alkyl acrylate terpolymer, or an ethylene/acrylic acid/alkyl acrylate terpolymer.

Acid copolymers are well known in the golf ball art. Examples of acid copolymers that fulfill the criteria set forth above include, but are not limited to, those sold under the trade names Escor™ (ethylene/acrylic acid copolymers) and Iotek™ (ethylene/acrylic acid/acrylate terpolymers) by ExxonMobil, namely, Escor™ 959, Escor™ 960, Escor™ AT325 and Iotek™ 7510. Other examples of acid copolymers include those sold under the trade name Primacor™ (ethylene/acrylic acid copolymers) by Dow Chemical Company, namely Primacor™ 5980I and Primacor™ 3340I. Other acid copolymers that may be used include ethylene/methacrylic acid copolymers such as sold under the trade names Surlyn™ and Nucrel™ by DuPont. Surlyn™ copolymers are neutralized with zinc, sodium or lithium ions. Nucrel™ copolymers are inherently flexible like ethylene vinyl acetate (EVA) copolymers and offer desirable performance characteristics similar to those of Surlyn™. Nucrel™ copolymers are produced by reacting ethylene and methacrylic acid in the presence of free radical initiators. A branched, random ethylene/methacrylic acid (EMAA) copolymer is produced thereby. Carboxyl groups are distributed along the polymer chain and interact with carboxyl groups on adjacent molecules to form a weakly cross-linked network through hydrogen bonding. Nucrel™ and Surlyn™ terpolymers are also available for use in a thermoplastic material of the invention.

Acid copolymers of a thermoplastic material of the invention are neutralized to a desired percentage through the use of metal cation salts. The salts utilized are those that provide the metal cations capable of neutralizing, to various extents, the carboxylic acid groups of the acid copolymer. These salts include, for example, acetate, oxide or hydroxide salts of lithium, calcium, zinc, sodium, potassium, nickel, magnesium, aluminum, zirconium or manganese.

Some examples of salts comprising lithium cations are lithium hydroxide monohydrate, lithium hydroxide, lithium oxide and lithium acetate. Salts comprising calcium cations include calcium hydroxide, calcium acetate and calcium oxide. Suitable salts comprising zinc cations are zinc acetate dihydrate, zinc acetate or a blend of zinc oxide and acetic acid. Examples of salts comprising sodium cations include sodium hydroxide and sodium acetate. Similarly, salts comprising potassium cations include potassium hydroxide and potassium acetate. Suitable salts comprising nickel cations are nickel acetate, nickel oxide and nickel hydroxide. Salts comprising magnesium cations include magnesium oxide, magnesium hydroxide and magnesium acetate. Salts comprising manganese cations include manganese acetate and manganese oxide.

Additionally a wide variety of pre-neutralized acid polymers are commercially available for a thermoplastic material of the invention. These pre-neutralized acid polymers include both hard and soft pre-neutralized ionomeric resins as well as both low and high acid pre-neutralized ionomeric resins.

Hard (high modulus) pre-neutralized ionomeric resins include those having a hardness greater than 50 on the Shore D scale as measured in accordance with ASTM D-2240 and a flexural modulus from about 15,000 to about 70,000 psi as measured in accordance with ASTM standard test method D-790 (ASTM D-790).

Soft (low modulus) pre-neutralized ionomeric resins are generally acrylic acid or methacrylic acid based. One example of a soft pre-neutralized ionomer resin comprises a zinc based ionomer made from an acrylic acid polymer and unsaturated monomers of the acrylate ester class. The soft ionomeric resins generally have a hardness from about 20 to about 50 or, preferably, from about 30 to about 40 as measured on the Shore D scale and a flexural modulus from about 2,000 to about 15,000 psi or, preferably, from about 3,000 to 10,000 psi as measured in accordance with ASTM D-790. Examples of hard and soft ionomeric resins include those sold under the Iotek™ and Surlyn™ trade names.

The golf ball 10 has at least one layer composed of the thermoplastic material of the invention comprising about 10 to about 95% by weight of at least one neutralized acid copolymer and, preferably, from about 15 to about 90% acid copolymer.

Generally, ethylene/alkyl acrylate copolymers include ethylene and acrylic or methacrylic esters of linear, branched or cyclic alkanols. Preferably, the copolymers contain from about 1 to about 35 weight % alkyl acrylate and from about 99 to about 65 weight % ethylene.

Examples of ethylene/alkyl acrylate copolymers that may be used include, among others, ethylene/ethyl acrylate (EEA), ethylene/methyl acrylate (EMA) and ethylene/butyl acrylate (EBA). EEA copolymers are made by the polymerization of ethylene units with randomly distributed ethylene acrylate (EA) monomer groups. The copolymers contain up to about 30% by weight of EA. The copolymers are tough and flexible having a relatively high molecular weight. The copolymers have good flexural fatigue and low temperature properties (down to −65° C.). In addition, EEA resists environmental stress cracking as well as ultraviolet (UV) radiation. Examples of EEA copolymers include those sold under the trade name Bakelite™ by the Union Carbide Corporation. EEA is similar to ethylene vinyl acetate (EVA) in its density-property relationships and high-temperature resistance. In addition, like EVA, EEA is not resistant to aliphatic and aromatic hydrocarbons.

EMA copolymers contain up to about 30% by weight of methyl acrylate and yield blown films having rubberlike limpness and high impact strength. These copolymers may be useful in coating and laminating applications as a result of their good adhesion to commonly used substrates. EMA also has good heat-seal characteristics.

EMA copolymers are manufactured by reacting, at high temperatures and pressures, methyl acrylate monomers with ethylene and free radical initiators. Polymerization occurs such that the methyl acrylate forms random pendant groups on the polyethylene backbone. The acrylic functionality decreases polymer crystallinity and increases polarity, enhancing polymer properties. These properties depend on molecular weight (determined, for example, by melt index) and percent crystallinity. Percent crystallinity is determined by the extent of methyl acrylate comonomer incorporation. As the methyl acrylate content increases, the film becomes softer, tougher and easier to heat seal.

EMA films have low moduli (generally less than 10,000 psi), low melting points and good impact strengths. In addition, EMA copolymers are highly polar and, as a result, are compatible with olefinic and other polymers. They adhere well to many substrates including low density polyethylene (LDPE), linear low density polyethylene (LLDPE) and EVA.

Examples of EMA copolymers for use in the golf ball components of the present invention include those sold under the trade names Optema™ or Escor™ by ExxonMobil. Optema™ and Escor™ are thermally stable polymers that will accept up to 65% or more fillers and pigments without losing their properties. These copolymers are more thermally stable than EVA and can be extruded or molded over a range of temperatures from 275 to 625° F. (compared to the limit of 450° F. for EVA copolymers). EMA copolymers are generally not corrosive as compared to EVA and EAA copolymers.

EBA copolymers can also be included in a thermoplastic material of the invention. These are generally similar to EMA copolymers with improved low temperature impact strength and high clarity. For example, the EBA copolymer sold under the trade name EBAC™ by the Chevron Corporation is stable at high temperatures and may be processed as high as 600° F.

Metal cation salts may also be utilized to neutralize ethylene/alkyl acrylate copolymers as a source of the corresponding carboxylic acid. The salts to be used are those salts that provide the metal cations capable of hydrolyzing and neutralizing, to various extents, the carboxylic acid ester groups of the copolymers. This converts the alkyl ester into a metal salt of the acid. These metal cation salts include, but are not limited to, oxide, carbonate or hydroxide salts of alkali metals such as lithium, sodium, potassium or mixtures thereof. Some examples hydroxide salts of alkali metals include, but are not limited to, lithium hydroxide monohydrate, lithium hydroxide, lithium carbonate, lithium oxide, sodium hydroxide, sodium oxide, sodium carbonate, potassium hydroxide, potassium oxide and potassium carbonate.

The amount of metal cation salt, preferably, an alkali metal cation salt reacted with an ethylene/alkyl acrylate copolymer varies depending upon such factors as the reactivity of the salt and copolymer used, reaction conditions (such as temperature, pressure, moisture content and the like) and the desired level of conversion. Preferably, the reaction occurs through saponification, wherein the carboxylic acid ester groups of the ethylene/alkyl acrylate copolymer are converted by alkaline hydrolysis to form the salt of the acid and alcohol. Examples of such reactions are set forth in U.S. Pat. Nos. 3,970,626, 4,638,034 and 5,218,057, which are incorporated herein by reference.

The products of the conversion reaction are an alkanol (the alkyl group of which comes from the alkyl acrylate comonomer) and a terpolymer of ethylene, alkyl acrylate, and an alkali metal salt of the (meth) acrylic acid. The degree of conversion or saponification is variable depending on the amount of alkali metal cation salt used and the saponification conditions. Generally, from about 10 to about 60% of the ester groups are converted during the saponification reaction. The alkanol and other by products can be removed by normal separation processes leaving the remaining metal cation neutralized (or hydrolyzed) ester-based ionomer resin reaction product.

Alternatively, the ethylene alkyl acrylate copolymer included in the invention can be commercially obtained in a pre-neutralized or saponified condition. For example, a number of metal cation neutralized ester-based ionomer resins produced under the saponification process of U.S. Pat. No. 5,218,057 are available from the Chevron Corporation.

Additional examples of the preferred copolymers that fulfill the criteria set forth above are a series of acrylate copolymers that are commercially available from ExxonMobil, such as Optema™ ethylene methyl acrylates and Enable™ ethylene butyl acrylates; Elvaloy™ ethylene butyl acrylates available from DuPont, and Lotryl™ ethylene butyl acrylic esters available from Atofina Chemical.

The acrylate ester is preferably an unsaturated monomer having from 1 to 21 carbon atoms, which serves as a softening comonomer. The acrylate ester preferably is methyl, ethyl, n-propyl, n-butyl, n-octyl, 2-ethylhexyl or 2-methoxyethyl 1-acrylate and most preferably is methyl acrylate or n-butyl acrylate. Another suitable type of softening comonomer is an alkyl vinyl ether selected from the group consisting of n-butyl, n-hexyl, 2-ethylhexyl and 2-methoxyethyl vinyl ethers.

The acrylate ester-containing ionic copolymer or copolymers used in golf ball components can be obtained by neutralizing commercially available acrylate ester-containing acid copolymers such as poly (ethylene/methyl acrylate/acrylic acid) terpolymers sold by ExxonMobil under the trade name Escor™ ATX or poly (ethylene/butyl acrylate/methacrylic acid) terpolymers sold by DuPont under the trade name Nucrel™. The acid groups of these materials and blends thereof are neutralized with one or more of various metal cation salts that include zinc, sodium, magnesium, lithium, potassium, calcium, manganese, nickel and the like. The extent of neutralization can range from 10 to about 100%, preferably from about 30 to about 100% or, more preferably, from about 40 to about 90%. Generally, a higher degree of neutralization results in a harder and tougher thermoplastic material.

The metallocene-catalyzed copolymers or plastomers of a thermoplastic material of the invention include ethylene alpha olefin copolymers wherein the alpha olefin preferably has from 4 to 8 carbon atoms. Such plastomers are polyolefin copolymers developed using metallocene single-site catalyst technology. Polyethylene plastomers produced by metallocene single-site catalysis generally have better impact resistance than those made via Ziegler-Natta catalysis. Plastomers exhibit both thermoplastic and elastomeric characteristics. In addition to being comprised of a polyolefin such as ethylene, plastomers contain up to about 35 weight % softening comonomer. Plastomers of a thermoplastic material of the invention include, but are not limited to, ethylene/butene copolymers, ethylene/octene copolymers, ethylene/hexene copolymers, ethylene/hexene/butene terpolymers and mixtures thereof.

The plastomers included in a thermoplastic material of the invention may be formed by single-site metallocene catalysis such as disclosed in EP 0029358, U.S. Pat. Nos. 4,752,597, 4,808,561, and 4,937,299, the teachings of which are incorporated herein by reference. Blends of plastomers can also be used for the thermoplastic material. As is known in the art, plastomers can be produced by solution, slurry and gas phase processes, although preferred plastomers for a thermoplastic material of the invention are produced by metallocene catalysis. For example, a high pressure process can be used to polymerize ethylene in combination with other olefin monomers such as butene-1, hexene-1, octene-1 and 4-methyl-1-pentene in the presence of a catalyst system comprising a cyclopentadienyl-transition metal compound and an alumoxane.

Examples of plastomers that may be used in a thermoplastic material of the invention are those sold by ExxonMobil under the trade name Exact™, preferably, Exact™ 3024, Exact™ 3025, Exact™ 4049 and Exact™ 3027 (ethylene/butene copolymers). Other useful plastomers include, but are not limited to, ethylene/hexene copolymers such as Exact™ 3031.

Exact™ plastomers typically have a dispersion index ($M_w/M_n$, where $M_w$ is weight average molecular weight and $M_n$ is number average molecular weight) of about 1.5 to 4.0, a density of about 0.86 to about 0.93 g/cc, a melting point of about 140-220° F. and a melt index (MI) above about 0.5 g/10 mins. Plastomers that may be employed in a thermoplastic material of the invention include copolymers of ethylene and at least one $C_3$ to $C_{20}$ alpha olefin, preferably a $C_4$ to $C_8$ alpha olefin present in an amount of about 5 to about 32 weight %. Such plastomers are believed to have a composition distribution breadth index of about 45% or more.

Plastomers such as those sold by Dow Chemical Co. under the trade name Engage™ also may be employed in a thermoplastic material of the invention. These plastomers may be produced as disclosed in U.S. Pat. No. 5,272,236, the teachings of which are incorporated herein by reference. Such plastomers are substantially linear polymers having a density of about 0.85 g/cc to about 0.93 g/cc as measured in accordance with ASTM standard test method D-792 (ASTM D-792), a melt index (MI) of less than 30 g/10 minutes and a dispersion index $M_w/M_n$ that is preferably less than 5. The plastomers include homopolymers of $C_2$ to $C_{20}$ olefins such as ethylene, propylene, 4-methyl-1-pentene and the like. Alternatively, the plastomers can be interpolymers of ethylene with at least one $C_3$ to $C_{20}$ alpha-olefin and/or $C_2$ to $C_{20}$ acetylenically unsaturated monomer and/or $C_4$ to $C_{18}$ diolefins. These plastomers can have a polymer backbone that is either unsubstituted or substituted with up to 3 long chain branches/1000 carbon atoms. As used herein, long chain branching means a chain length of at least about 6 carbon atoms, above which the length of the chain cannot be distinguished using $^{13}C$ nuclear magnetic resonance (NMR) spectroscopy. Preferred Engage™ plastomers are characterized by a saturated ethylene/octene backbone and a narrow dispersion index $M_w/M_n$ of about 2. Various commercially available plastomers may be useful in the invention, including those manufactured by Mitsui.

Plastomers of a thermoplastic material of the invention are compatible with many conventional plasticizers and fillers. Such fillers include, but are not limited to, clay, talc, asbestos, graphite, glass, mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, aluminum, bismuth, nickel, molybdenum, iron, copper, brass, boron, bronze, cobalt, beryllium and alloys thereof), metal oxides (such as zinc oxide, iron oxide, aluminum oxide, titanium oxide, magnesium oxide, zirconium oxide and the like), particulate synthetic plastic (such as high molecular weight polyethylene, polystyrene, polyethylene ionomeric resins and the like), particulate carbonaceous materials (such as carbon black, natural bitumen and the like), as well as cotton flock, cellulose flock and/or leather fiber. Dark colored fillers generally are not preferred for use in an outer layer of a golf ball if a white ball is desired. In such an instance, a two-layer cover can be used in which a non-white filler is present only in the inner layer of the cover. The amount of filler employed is primarily a function of weight restrictions on a golf ball. For example, weight may be removed from a golf ball core and placed in an inner and/or outer layer of the golf ball cover. Such added weight will change the moment of inertia of the golf ball, thereby potentially altering its performance.

The dispersion index of plastomers made in accordance with U.S. Pat. No. 5,272,236 is, preferably, about 2.0. Non-limiting examples of these plastomers include Engage™ CL 8001, CL 8002, CL 8003, EG 8100, 8150, 8200 and Engage™ EP 8500.

The fatty acids and salts of fatty acids generally comprise fatty acids neutralized with metal cations. The fatty acids can be saturated or unsaturated fatty acids and are generally composed of a chain of alkyl groups containing from about 2 to about 80 carbon atoms, preferably from about 4 to about 30, usually an even number, and terminate with a carboxyl (—COOH) group. The general formula for fatty acids (except for acetic acid) is $CH_3(CH_2)_xCOOH$, wherein the carbon atom count includes the carboxyl group and X is from about 4 to about 30 carbon atoms. Examples of fatty acids suitable for use include, but are not limited to, stearic acid, oleic acid, palmitic acid, pelargonic acid, lauric acid, butyric acid, valeric acid, caproic acid, caprylic acid, capric acid, myristic acid, margaric acid, arachidic acid, behenic acid, lignoceric acid, cerotic acid, carboceric acid, montanic acid and melissic acid. Such fatty acids are preferably neutralized with metal cations such as zinc, calcium, magnesium, barium, sodium, lithium, aluminum or combinations thereof, although other metal cations may also be used. The metal cations are generally from metal cation salts that neutralize, to various extents, the carboxylic acid groups of the fatty acids. Examples of metal cation salts include sulfate, carbonate, acetate and hydroxylate salts of metals such as zinc, calcium, magnesium and barium. Examples of the fatty acid salts that may be utilized in a thermoplastic material of the invention include, but are not limited to, metal stearates, laureates, oleates, palmitates, pelargonates and the like such as zinc stearate, calcium stearate, magnesium stearate, barium stearate and so forth. Metal stearates are known in the art and are commercially available from various manufacturers.

Highly neutralized blends of copolymers used to form the golf ball components of the present invention can be produced by reacting the two copolymers with various amounts of the metal cation salts at a temperature above the crystalline melting point of the copolymers, for example, from about 200 to about 500° F. and, preferably, from about 250 to about 425° F. under high shear conditions at a pressures of from about 100 to 10,000 psi. Other well known blending techniques in the art may also be used. The amount of metal cation salt used to produce the highly neutralized blend of copolymers is the quantity that provides a sufficient amount of the metal cations to neutralize a desired percentage of the carboxylic acid groups of the acid copolymer. The copolymers can be blended before or after neutralization, or they can be mixed and neutralized at the same time (that is, the copolymers, metal cation salts and fatty acids or salts of fatty acids are mixed together). The fatty acids or salts of fatty acids are added in the desired amounts, generally from about 5 to about 100 parts by weight, preferably from about 10 to about 60 parts by weight, more preferably from about 20 to about 50 parts by weight and even more preferably from about 30 to about 40 parts by weight.

The various compositions of the present invention may be produced according to conventional melt blending procedures. In a preferred embodiment, the copolymers are blended in a Banbury™ type mixer, two-roll mill or extruder prior to neutralization. After blending, neutralization then occurs as the polymers are in a melt or molten state within the Banbury™ type mixer, two-roll mill or extruder. The blended composition is then formed into slabs, pellets or the like and maintained in such a state until molding is desired. Alternatively, a simple dry blend of the pelletized or granulated copolymers, which have previously been neutralized to a desired extent (and colored masterbatch, if desired) may be prepared and fed directly into the injection molding machine where homogenization occurs in the mixing section of the barrel prior to injection into the mold. If necessary, further additives such as inorganic fillers may be added and uniformly mixed in before initiation of the molding process.

The compatibility of a metallocene-catalyzed copolymer with an acid copolymer results in a thermoplastic material blend having superior properties over standard ionomeric resin blends as shown by the results provided in the Examples detailed below.

Additional materials may also be added to a thermoplastic material of the invention when utilized for golf equipment so long as such materials do not substantially reduce the playability properties of the equipment. Exemplary materials include dyes such as Ultramarine Blue™ sold by Whitaker, Clark & Daniels, Incorporated (see U.S. Pat. No. 4,679,795), pigments such as titanium dioxide, zinc oxide, barium sulfate and zinc sulfate, UV absorbers, antioxidants, antistatic agents, and stabilizers. Moreover, the ball cover compositions utilizing the thermoplastic material of the invention may also contain softening agents such as those disclosed in U.S. Pat. Nos. 5,312,857 and 5,306,760. Exemplary softeners include plasticizers, processing acids, and the like, and reinforcing materials such as glass fibers and inorganic fillers, as long as the desired properties of the golf ball produced are not impaired.

Various fillers may be added to golf ball compositions to reduce manufacturing costs, to increase or decrease weight, to reinforce the thermoplastic material, adjust ball layer density or flex modulus, aid in ball mold release and/or adjust the melt flow index of the thermoplastic material and the like. Examples of heavy weight fillers include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, zirconium oxide) and metal stearates (such as zinc stearate, calcium stearate, barium stearate, lithium stearate and magnesium stearate). Other preferred fillers include limestone (ground calcium or magnesium carbonate) and ground flash filler.

Fillers that may be used in the layers of a golf ball (other than the outer cover layer) are typically in a finely divided form such as, for example, in a particle size generally less than about 20 U.S. standard mesh and, preferably, less than about 100 U.S. standard mesh (except for fibers and flock, which are generally elongated). Flock and fiber sizes should be small enough to facilitate processing. Filler particle size will depend upon the desired effect, cost, ease of addition and dusting considerations. A filler for a golf ball layer preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro-balloons and combinations thereof. Non-limiting examples of suitable fillers, their densities or specific gravities (spec. grav.) and preferred uses are listed in Table 1:

TABLE 1

| FILLERS | | |
|---|---|---|
| FILLER TYPE | SPEC. GRAV. | COMMENT |
| Precipitated hydrated silica | 2.00 | 1, 2 |
| Clay | 2.62 | 1, 2 |
| Talc | 2.85 | 1, 2 |
| Asbestos | 2.50 | 1, 2 |
| Glass fibers | 2.55 | 1, 2 |
| Aramid fibers (KEVLAR) | 1.44 | 1, 2 |
| Mica | 2.80 | 1, 2 |
| Calcium metasilicate | 2.90 | 1, 2 |
| Barium sulfate | 4.60 | 1, 2 |
| Zinc sulfide | 4.10 | 1, 2 |

TABLE 1-continued

| FILLERS | | |
|---|---|---|
| FILLER TYPE | SPEC. GRAV. | COMMENT |
| Lithopone | 4.2-4.3 | 1, 2 |
| Silicates | 2.10 | 1, 2 |
| Silicon carbide platelets | 3.18 | 1, 2 |
| Silicon carbide whiskers | 3.20 | 1, 2 |
| Tungsten carbide | 15.60 | 1 |
| Diatomaceous earth | 2.30 | 1, 2 |
| Polyvinyl chloride | 1.41 | 1, 2 |
| CARBONATES | | |
| Calcium carbonate | 2.71 | 1, 2 |
| Magnesium carbonate | 2.20 | 1, 2 |
| METAL AND ALLOYS (POWDERS) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.20 | 1 |
| Iron | 7.86 | 1 |
| Steel | 7.8-7.9 | 1 |
| Lead | 11.40 | 1, 2 |
| Copper | 8.94 | 1 |
| Brass | 8.2-8.4 | 1 |
| Boron | 2.34 | 1 |
| Boron carbide whiskers | 2.52 | 1, 2 |
| Bronze | 8.70-8.74 | 1 |
| Cobalt | 8.92 | 1 |
| Beryllium | 1.84 | 1 |
| Zinc | 7.14 | 1 |
| Tin | 7.31 | 1 |
| METAL OXIDES | | |
| Zinc oxide | 5.57 | 1, 2 |
| Iron oxide | 5.10 | 1, 2 |
| Aluminum oxide | 4.00 | |
| Titanium oxide | 3.9-4.1 | 1, 2 |
| Magnesium oxide | 3.3-3.5 | 1, 2 |
| Zirconium oxide | 5.73 | 1, 2 |
| METAL STEARATES | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| PARTICULATE CARBONACEOUS | | |
| Graphite | 1.5-1.8 | 1, 2 |
| Carbon black | 1.80 | 1, 2 |
| Natural bitumen | 1.2-1.4 | 1, 2 |
| Cotton flock | 1.3-1.4 | 1, 2 |
| Cellulose flock | 1.15-1.5 | 1, 2 |
| Leather fiber | 1.2-1.4 | 1, 2 |
| MICRO BALLOONS | | |
| Glass | 0.15-1.1 | 1, 2 |
| Ceramic | 0.2-0.7 | 1, 2 |
| Fly ash | 0.6-0.8 | 1, 2 |
| COUPLING AGENTS | | |
| Titanates | 0.95-1.17 | |
| Zirconates | 0.92-1.11 | |
| Silane | 0.95-1.2 | |

Comments:
1 Particularly useful for adjusting density of the cover layer.
2 Particularly useful for adjusting flex modulus of the cover layer.
3 Particularly useful for adjusting mold release of the cover layer.
4 Particularly useful for increasing melt flow index of the cover layer.

Most fillers except for metal stearates would be expected to reduce the melt flow index of an injection molded golf ball cover layer.

The amount of filler used in a golf ball layer is primarily a function of the weight and distribution requirements of the ball.

Fillers may be added to any or all layers of a golf ball. Such fillers may be used to adjust the properties of a golf ball layer, reinforce the layer or for any other purpose. In a thermoplastic material blend of the invention, reinforcing fillers may be used without detracting from or significantly reducing the coefficient of restitution (COR) of the material in a golf ball layer.

Together, the core 12 of the golf ball (and any optional core layers) and its cover layer 16 or layers 14 preferably combine to form a ball having a diameter of 1.680 inches or more, the minimum diameter permitted by the rules of the USGA, and weighing no more than 1.62 ounces for a regulation golf ball. Oversize golf balls may also be produced, if desired, using a thermoplastic material blend of the invention.

In another embodiment of the invention, the golf ball may be a one-piece or unitary construction golf ball comprising the blend of the invention. A thermoplastic material blend of the invention provides for a very durable golf ball. Such a golf ball may be painted or may have a clear coat or other markings if desired.

In a particularly preferred embodiment of the invention, the golf ball has a dimple pattern that provides coverage of 65% or more. The golf ball typically is coated with a durable, abrasion-resistant and relatively non-yellowing finish coat.

A golf ball and its components can be produced by molding processes that include, but are not limited to, those that are well known in the art. For example, golf ball components can be produced by injection molding, reaction injection molding, liquid injection and/or compression molding the partially to highly neutralized thermoplastic material blend of the invention as a golf ball core, core layer, cover layer and so forth. One or more layers of a golf ball may comprise the partially to highly neutralized blend according to the invention. Other layers of a golf ball may be made of the same or different materials and may comprise any suitable material or blend thereof known in the art.

The thermoplastic material of the invention preferably has a Shore D hardness of from about 30 to about 80 Shore D as desired. Additionally, a golf ball core, intermediate ball or finished ball may have a PGA compression of from about 0 to about 160.

After a golf ball has been molded, it may undergo various further processing steps such as buffing, painting and marking as disclosed in U.S. Pat. No. 4,911,451.

The present invention is further illustrated by the following examples in which the parts of the specific ingredients are by weight. It is to be understood that the present invention is not limited to the examples as various changes and modifications may be made to the invention without departing from the spirit and scope thereof.

EXAMPLES

Coefficient of restitution (COR) was measured by firing a resulting golf ball via an air cannon (at a velocity of 125 feet per second) toward a steel plate positioned 12 feet from the muzzle of the cannon. The rebound velocity was then measured. The rebound velocity was divided by the velocity of the golf ball leaving the air cannon to give the COR.

The term "compression" as used in the golf ball art generally defines the overall deflection that a golf ball undergoes when subjected to a compressive load. For example, compression indicates the amount of change in a golf ball's shape upon striking. The development of solid core technology in two-piece or multi-piece solid balls has allowed for much more precise control of compression in comparison to thread wound, three-piece balls. This result is because in the manufacture of solid core golf balls, the amount of deflection or deformation is precisely controlled by the chemical formula used in making the core(s). This differs from thread wound, three-piece golf balls in which compression is controlled in part by the winding process of the elastic thread. Thus, two- and multi-piece (or component) solid core golf balls exhibit much more consistent compression readings than balls having thread wound cores (e.g., thread wound three-piece golf balls). In the past, PGA compression related to a scale of golf ball compression from 0 to 200. The lower the PGA compression value, the softer the feel of the ball upon striking. In practice, tournament quality balls have PGA compression ratings around 40 to 110, and preferably around 50 to 100.

In determining PGA compression using the 0 to 200 scale, a standard force is applied to the external surface of the ball. A ball that exhibits no deflection (0.0 inches of deflection) is rated 200 and a ball that deflects 0.2 inches is rated 0. Every change of 0.001 inch in deflection represents a 1 point drop in compression value. Consequently, a ball that deflects 0.1 inches (100×0.001 inches) has a PGA compression value of 100 and a ball that deflects 0.110 inches (110×0.001 inches) has a PGA compression value of 90.

In order to assist in the determination of PGA compression, several devices have been employed in the art. For example, PGA compression is determined by a golf ball compression tester fashioned in the form of a press with an upper and lower anvil. The upper anvil is at rest against a 200 pound (lbs) die spring, and the lower anvil is movable through 0.300 inches by means of a crank mechanism. In the open position, the gap between the anvils is 1.780 inches, allowing a clearance of 0.200 inches for insertion of the ball. As the lower anvil is raised by the crank mechanism, it compresses the ball against the upper anvil, with such compression occurring during the last 0.200 inches of lower anvil stroke. The golf ball then loads the upper anvil, which in turn loads the die spring. The equilibrium point of the upper anvil is measured by a dial micrometer. When the upper anvil is deflected by the golf ball more than 0.100 in (a lesser extent of deflection is simply regarded as zero compression), the reading on the micrometer dial is referred to as the compression of the ball. In practice, tournament quality golf balls have PGA compression ratings around 80 to 100, which means that the upper anvil was deflected a total of 0.120 to 0.100 inches. When golf ball components (i.e., centers, cores, mantled core, etc.) with diameters smaller than 1.680 inches are utilized, metallic shims are included such that the combined diameter of the shims and the component is 1.680 inches.

Determining golf ball compression can also be carried out via a compression tester sold by OK Automation, formerly, Atti Engineering Corporation. This golf ball compression tester is calibrated against a calibration spring provided by OK Automation. The compression value obtained by such a tester (referred to as Atti compression) relates to an arbitrary value expressed by a number that may range from 0 to 100 (a value of 200 can also be measured by two revolutions of a dial indicator, which is described below). Atti compression values that are obtained define the deflection that a golf ball undergoes when subjected to compressive loading. The golf ball compression tester consists of a lower movable platform and an upper movable spring-loaded anvil. A dial indicator of the compression tester is mounted such that it measures the upward movement of the spring-loaded anvil. A golf ball to be tested is placed in the lower platform, which is then raised a fixed distance. The upper portion of the golf ball comes in contact with and exerts a pressure on the spring-loaded anvil, forcing the anvil upward against a spring.

Alternative devices, apparatuses or testers have also been employed to determine golf ball compression. For example, a modified Riehle compression device (Riehle Bros. Testing Machine Company) can be used to evaluate the compression of various golf ball components (i.e., cores, mantle cover balls, finished balls, etc.). The modified Riehle compression device determines golf ball deformation in thousandths of an inch via a load designed to emulate the 200 lbs spring constant of other golf ball compression testers such as those described above. With a modified Riehle compression device, a Riehle compression value of 61 corresponds to a load deflection of 0.061 in. Furthermore, additional golf ball compression devices, apparatuses or testers may also be utilized to monitor and evaluate ball compression. Such devices, apparatuses or testers include a Whitney tester and Instron™ device, which can correlate or correspond to, for example, PGA or Atti compression values.

In the examples below, compression was measured using an Instron™ device, namely, model 5544. Compression of golf ball components were measured based on the deflection (in inches) caused by a 200 lbs load applied during a load control mode with a rate of 15 kilopounds per second (kips $s^-$), an approach speed of 20 in per minute and a preload of 0.2 pound-force (lbf) (in addition to device system compliance).

Another factor relating to golf ball component properties was determined by taking the sum of compression and COR measurements and multiplying such a value by 1,000. The factor, referred to as the Nes Factor, represents an optimal combination of softer, more resilient golf ball cores.

Polymers sold under the trade names HPF™ 1000 and HPF™ 2000 by DuPont, which are commercially available EXY materials presumably produced using a fatty acids such as magnesium stearate or magnesium oleate, were also used in the examples below. Such polymers were used as purchased and without modification.

As used herein, the Shore D hardness of a golf ball cover was measured in accordance with ASTM D-2240, although such measurements were made on the curved surface of the molded cover rather than on a plaque. Furthermore, the Shore D hardness of golf ball covers were measured with the cover in place over the core of the ball. When a hardness measurement is made on a dimpled or other aerodynamic patterned cover, Shore D hardness is measured across a land area of the cover.

Example One

The samples in the present example were produced using different starting materials to compare an acid copolymer and alkyl acrylate copolymer blend (referred to as EX/EY) against an acid copolymer and metallocene copolymer thermoplastic material blend of the invention (referred to as EX/EM). These starting materials were studied as a core of a two-piece golf ball. Both blends were mixed (dry blending) together in various combinations and extruded in a Prism twin screw extruder to form the core of the ball. Standard golf ball covers were molded over the formed cores to produce a finished two-piece ball. The golf ball covers comprised a blend of the Surlyn™ resins 8940, 9910, 8320 and 8120 with a white masterbatch. Study of these two-piece golf balls yield the results shown in Tables 2 and 3 below. Particular amounts in Tables 2 and 3 are in parts by weight unless stated otherwise.

TABLE 2

| | Sample No. (#) | | | | | | | |
|---|---|---|---|---|---|---|---|---|
| Blend Type | #1 EX/EY | #2 EX/EY | #3 EX/EY | #4 EX/EY | #5 EX/EY | #6 EX/EY | #7 EX/EM | #8 Control |
| Surlyn™ 9910 (EX) | 36 | 36 | 32 | 32 | 36 | 36 | 36 | — |
| Surlyn™ 8920 (EX) | 36 | 36 | 32 | 32 | 36 | 36 | 36 | — |
| Lotryl™ 29MA03 (EY) | 28 | 28 | 34 | 34 | 28 | 28 | 0 | — |
| Exact™ 4049 | 0 | 0 | 0 | 0 | 0 | 0 | 28 | — |
| Mg Stearate | 66.7 | 66.7 | 66.7 | 66.7 | 66.7 | 66.7 | 66.7 | — |
| Zn Powder | 33 | 33 | 33 | 33 | 33 | 33 | 33 | — |
| Mg(OH)$_2$ | 0 | 0.44 | 0 | 0 | 0 | 0 | 0 | — |
| Soft Regrind** | 0 | 0 | 0 | 0 | 15 | 0 | 0 | — |
| Ground Flash*** | 0 | 1.6 | 1.6 | 0 | 0 | 15 | 0 | — |

**Soft regrind was a very soft ground up rubber blend.
***Ground flash was a mixture of multiple golf ball core types ground up.

TABLE 3

| | Sample No. (#) | | | | | | | |
|---|---|---|---|---|---|---|---|---|
| Blend Type | #1 EX/EY | #2 EX/EY | #3 EX/EY | #4 EX/EY | #5 EX/EY | #6 EX/EY | #7 EX/EM | #8 Control |
| Core Size | 1.518 | 1.517 | 1.522 | 1.52 | 1.524 | 1.519 | 1.519 | 1.558 |
| Core Weight | 33.02 | 33.25 | 33.46 | 33.41 | 33.23 | 32.95 | 32.82 | 37.8 |
| Core Comp. (Instron™) | 0.078 | 0.081 | 0.077 | 0.078 | 0.083 | 0.084 | 0.082 | 0.098 |
| Core COR | 0.764 | 0.767 | 0.754 | 0.761 | 0.763 | 0.764 | 0.776 | 0.78 |
| Core Nes Factor | 842 | 848 | 831 | 839 | 846 | 848 | 858 | 878 |
| Ball Comp. (Instron™) | 0.073 | 0.074 | 0.073 | 0.075 | 0.075 | 0.079 | 0.076 | 0.093 |
| Ball PGA Comp. | 113 | 111 | 116 | 114 | 113 | 108 | 110 | 86 |
| Ball COR | 0.772 | 0.777 | 0.765 | 0.771 | 0.774 | 0.773 | 0.785 | 0.794 |
| Ball Nes Factor | 845 | 851 | 838 | 846 | 849 | 852 | 861 | 887 |
| Ball Durability (Breaks) | None | None | None | None | None | None | None | Avg. 1045 Blows |

Sample no. 8 was a control golf ball with a conventional cross-linked polybutadiene core and the same type of cover as sample nos. 1 through 7. Sample nos. 1 to 6 were samples of the blend EX/EY. Sample no. 7 was a blend of EX/EM. As shown in the above results, the sample of EX/EM modified with magnesium stearate has an increased COR and Nes Factor over comparable samples of EX/EY. The golf ball core made with the EX/EM thermoplastic material blend of the invention was the best core type for COR and Nes Factor.

Example Two

The present example includes samples produced through an in-situ process in which the particular polymers were melt blended in an internal mixer. An oleic acid and Mg(OH)$_2$ were slowly added to a polymer melt mixture within the internal mixer. Mixing continued in the internal mixer until all of the oleic acid and Mg(OH)$_2$ were fully incorporated into the melt mixture. The mixture material was then removed from the internal mixer and allowed to cool. The mixture material was then extruded in a Prism twin screw extruder to neutralize the acid groups. Alternatively, neutralization is accomplished in the internal mixer. In yet another alternative process, oleic acid is added at the extrusion stage of the process. Alternative fatty acids and salts of fatty acids such as magnesium stearate, calcium linoleate and the like may be formed via such a process.

As used in Table 4, EX is an acid copolymer, EY is an ethylene acrylate copolymer, EXY is an acid terpolymer and EM is a metallocene-catalyzed alpha olefin copolymer containing a softening comonomer (e.g., hexene, butene, octene, etc.).

TABLE 4

| Blend Type | # 9 EX/EXY | # 10 (100%) EX/EXY | # 11 EX/EY | # 12 EX/EY | # 13 EX/EM |
|---|---|---|---|---|---|
| Primacor ™ 5980 (EX) | 25 pts | 25 pts | 50 pts | 50 pts | 50 pts |
| Escor ™ AT325 (EXY) | 75 pts | 75 pts | — | — | — |
| Lotryl ™ 29MA03 (EY) | — | — | 50 pts | 50 pts | — |
| Exact ™ 4049 (EM) | — | — | — | — | 50 pts |
| Oleic Acid | 66.7 pts | 66.7 pts | 66.7 pts | 66.7 pts | 66.7 pts |
| Mg(OH)$_2$ | ~10 pts | ~11 pts | ~10 pts | ~11 pts | ~11 pts |
| % Mg Oleate | ~40% | ~40% | ~40% | ~40% | ~40% |
| % Acrylic Acid | ~9.5% | ~9.5% | ~10% | ~10% | ~10% |
| Target Neutralization | 75% | 100% | 75% | 100% | 100% |
| Weight | 28.8 | 28.9 | 28.9 | 28.9 | 28.3 |
| Comp. (Instron ™) | 0.104 | 0.114 | 0.095 | 0.089 | 0.095 |
| COR | 0.806 | 0.795 | 0.816 | 0.824 | 0.797–0.833 *1 |
| Nes Factor | 910 | 909 | 911 | 913 | 892–928 |

*1 Some samples broke during testing for the COR. Upon visual inspection of the broken samples, it was determined that the cores of the samples had large voids, indicating that the polymers were wet during neat sphere molding. Unbroken samples had COR values up to 0.833.

Note:
Primacor ™ 5980 is an ethylene/acrylic acid copolymer with approximately 20% acid; Escor ™ AT325 is a 6% acrylic acid and 20% acrylate terpolymer; Lotryl ™ 29 MA03 is an ethylene/methyl acrylate copolymer with about 29% methyl acrylate; and Exact ™ 4049 is a metallocene plastomer with a butane comonomer.

Example Three

In the present example, golf ball cores composed of a thermoplastic material of the invention were prepared and tested. Polymers were blended in a Banbury™ type internal mixer. Oleic acid and Mg(OH)$_2$ were slowly added to the polymer melt mixture. The polymer melt mixture was mixed in the internal mixer until all of the liquid was completely incorporated into the melt mixture. The mixed material was removed from the internal mixer, cooled and granulated. The granulated particles were extruded in a Prism twin screw extruder to neutralize the acid groups (of oleic acid and any remaining unneutralized methacrylic acid in the Surlyn™ 6120 polymer. Neat spheres were then molded using an injection molding apparatus. The target neutralization level was approximately 90 to 95% of the acid groups. A neat sphere composed of a tungsten filled HPF™ 2000 material (sample no. 16) was prepared for comparison purposes. As shown in Table 5, EX/EM samples compared favorably to the tungsten filled HPF™ 2000 material. The EX/EM samples had compressions softer than the tungsten filled HPF™ 2000 material and were closer to compressions found in commercially available golf balls. The combination of soft compressions and high CORs produced golf ball cores with Nes factors exceeding those of IPF™ 2000 materials.

TABLE 5

| Sample No. (#) | Materials | Parts | Size | Weight | Comp. | COR | Nes Factor*1 |
|---|---|---|---|---|---|---|---|
| 14 (EX/EM) | Surlyn™ 6120<br>Exact™ 5361<br>Oleic Acid<br>Mg(OH)$_2$<br>Barytes | 50<br>50<br>66.7<br>8.3<br>40 | 1.527 | 32.5 | 0.101 | 0.781 | 882 |
| 15 (EX/EM) | Surlyn™ 6120<br>Exact™ 5361<br>Oleic Acid<br>Mg(OH)$_2$<br>Zn powder | 50<br>50<br>66.7<br>8.3<br>35 | 1.528 | 32.6 | 0.104 | 0.802 | 906 |
| 16 Comparative | HPF™ 2000<br>Tungsten powder | 100<br>24 | 1.523 | 34.9 | 0.089 | 0.807 | 896 |

Example Four

In the present example, golf ball cores composed of a thermoplastic material were prepared and tested. Polymers were blended in a Banbury™ type internal mixer. Oleic acid and Mg(OH)$_2$ were slowly added to the mixture. The polymer melt mixture was mixed in the internal mixer until all of the liquid was completely incorporated into the melt mixture. The mixture was removed from the internal mixer, cooled and granulated. The granulated particles were extruded in a Prism twin screw extruder for neutralization of oleic acid and any remaining unneutralized methacrylic acid in the Surlyn™ 6120 acid polymer. A second extrusion was also performed with several samples and compared to those prepared using only a single extrusion. Neat spheres were then molded using an injection molding apparatus. The target neutralization level was approximately 90 to 95%. A neat sphere composed of a HPF™ 2000 material (sample no. 20) was also prepared for comparison purposes.

TABLE 6

| Sample No. (#) | Materials | Parts |
|---|---|---|
| 17 | Surlyn™ 6120<br>Exact™ 4049<br>Oleic Acid<br>Mg(OH)$_2$ | 50<br>50<br>66.7<br>8.29 |
| 18 | Surlyn™ 6120<br>Exact™ 5371<br>Oleic Acid<br>Mg(OH)$_2$ | 50<br>50<br>66.7<br>8.29 |
| 19 | Surlyn™ 6120<br>Exact™ 5361<br>Oleic Acid<br>Mg(OH)$_2$ | 50<br>50<br>66.7<br>8.29 |
| 20 Comparative Example | HPF™ 2000 | 100 |

TABLE 7

| Sample No. (#) | Single Extrusion Properties | | | | Second Extrusion Properties | | | |
|---|---|---|---|---|---|---|---|---|
| | Comp. (Instron™) | COR | Nes factor | Shore C/D | Comp. (Instron™) | COR | Nes factor | Shore C/D |
| 17 | 0.106 | 0.815 | 921 | 68/47 | 0.106 | 0.815 | 921 | 68/48 |
| 18 | 0.108 | 0.815 | 923 | 67/47 | 0.107 | 0.814 | 921 | 67/47 |
| 19 | 0.114 | 0.817 | 931 | 65/44 | 0.113 | 0.817 | 930 | 66/45 |
| 20 | 0.094 | 0.840 | 934 | 75/54 | not tested | not tested | — | — |

A color shift in the samples was observed after the second extrusion, although there was no evidence of foaming and the reaction was complete. All samples molded easily into neat spheres. The samples that underwent a second extrusion exhibited a slightly hardened core with little or no effect on the COR. Exact™ 4049 is an ethylene/butene copolymer. Exact™ 5371 and 5361 are ethylene/octene copolymers. Surlyn™ 6120 is an acid copolymer featuring 19% methacrylic acid partially neutralized with magnesium.

The above results clearly show that the addition of a fatty acid salt increases compression, COR and Nes Factor values for golf ball components. The neutralization of the thermoplastic material blends with fatty acid salts provides additional improvement in such properties. Therefore, depending on the desired final properties of a cover (or mantle) component of a golf ball, different fatty acids or salts of fatty acids may be used.

In one embodiment, a golf ball 10 is constructed with a cover 16 composed of a polyurethane material as set forth in U.S. Pat. No. 6,117,024 from which pertinent parts are hereby incorporated by reference. The golf ball 10 has a core 12, a boundary layer 14 or both composed of a thermoplastic material of the present invention. The golf ball 10 preferably has a COR at 143 feet per second greater than 0.7964 and a USGA initial velocity less than 255.0 feet per second. The golf ball 10, more preferably, has a COR of approximately 0.8152 at 143 feet per second, and an initial velocity between 250 to 255 feet per second under USGA initial velocity conditions. A more thorough description of a high COR golf ball is disclosed in U.S. Pat. No. 6,443,858 from which pertinent parts are hereby incorporated by reference.

Additionally, the core of a golf ball 10 may be solid, hollow or filled with a fluid such as a gas or liquid. The golf ball can also have a metal mantle. The cover 16 of the golf ball 10 may be any suitable material. A preferred cover for a three-piece golf ball is composed of a thermoset polyurethane material. Alternatively, the cover 16 is composed of a thermoplastic polyurethane, ionomeric resin blend, ionomeric rubber blend, ionomeric resin, thermoplastic polyurethane blend or like. Alternatively, the golf ball 10 may have a thread layer. Those skilled in the pertinent art will recognize that other cover materials may be utilized without departing from the scope and spirit of the present invention. The golf ball 10 may have a finish of one or two base-coats and/or one or two top-coats.

In an alternative embodiment of a golf ball 10, the boundary layer 14 or cover layer 16 is comprised of a high acid (i.e., greater than 16 weight % acid) ionomeric resin or high acid ionomeric resin blend and the core 12 is composed of a thermoplastic material of the present invention. Alternatively, if the cover layer 16 is composed of a high acid ionomeric resin or a high acid ionomeric resin blend, then the boundary layer 14 and/or core 12 is composed of the thermoplastic material of the present invention. More preferably, the boundary layer 14 is comprised of a blend of two or more high acid (i.e., greater than 16 weight % acid) ionomeric resins neutralized, to various extents, by different metal cations.

In an alternative embodiment of a golf ball 10, the boundary layer 14 or cover layer 16 is comprised of a low acid (i.e., 16 weight % acid or less) ionomeric resin or low acid ionomeric resin blend. Preferably, the boundary layer 14 is comprised of a blend of two or more low acid (i.e., 16 weight % acid or less) ionomeric resins neutralized, to various extents, by different metal cations. The boundary layer 14 compositions of the embodiments described herein may include high acid ionomeric resins such as those developed by DuPont under the trade name Surlyn™, and by ExxonMobil under the Escor™ or Iotek™ trade names or blends thereof. Examples of compositions that may be used as the boundary layer 16 herein are set forth in detail in U.S. Pat. No. 5,688,869, which is incorporated herein by reference. Of course, such high acid ionomeric resin compositions are not limited in any way by those compositions set forth in U.S. Pat. No. 5,688,869. The compositions set forth in U.S. Pat. No. 5,688,869 are incorporated herein by way of example only.

High acid ionomeric resins that may be suitable for use in formulating the boundary layer 14 compositions are copolymers that are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the acid copolymer are partially neutralized (for example, approximately 10 to 100%, preferably, 30 to 70%) by the metal cations. Each of the high acid ionomeric resins that may be included in the inner layer components of a golf ball (components, for example, composed in part of a thermoplastic material of the invention) contains greater than 16% by weight of a carboxylic acid, preferably from about 17 to about 25% by weight of a carboxylic acid and, more preferably from about 18.5 to about 21.5% by weight of a carboxylic acid. Examples of high acid methacrylic acid ionomeric resins found suitable for use in accordance with the present invention include, but are not limited to, Surlyn™ 8220 and 8240 (both formerly known as forms of Surlyn™ AD-8422), Surlyn™ 9220 (zinc cation), Surlyn™ SEP-503-1 (zinc cation) and Surlyn™SEP-503-2 (magnesium cation). According to DuPont, all of these ionomeric resins contain from about 18.5 to about 21.5% by weight methacrylic acid. Examples of high acid acrylic acid ionomeric resins suitable for use in the present invention also include, but are not limited to, the high acid ethylene/acrylic acid copolymers produced by Exxon-Mobil such as Ex™ 1001, 1002, 959, 960, 989, 990, 1003, 1004, 993 and 994. Moreover, Escor™ or Iotek™ 959 are also copolymers that can be used with the present invention. According to ExxonMobil, Iotek™ 959 and 960 contain from about 19.0 to about 21.0% by weight acrylic acid with approximately 30 to about 70% of the acid groups neutralized with sodium and zinc cations, respectively.

Furthermore, a number of high acid ionomeric resins or ionomeric resin blends neutralized, to various extents, by several different types of metal cations such as manganese, lithium, potassium, calcium, sodium, zinc, magnesium and nickel cations are also available for use in golf ball component production as described herein. It has also been found that manganese, lithium, potassium, calcium or nickel metal cations can neutralize high acid ionomeric resin blends to produce boundary layer 16 compositions exhibiting enhanced hardness and resiliency due to synergies that occur during production. Consequently, high acid ionomeric resins and ionomeric resin blends neutralized with manganese, lithium, potassium, calcium or nickel cations can be blended to produce substantially higher CORs than those yielded by low acid ionomeric resin boundary layer 16 compositions that are commercially available.

More particularly, several high acid ionomeric resins have been produced by using a variety of metal cation salts to neutralize, to various extents, polymers comprising an alpha olefin and an alpha, beta-unsaturated carboxylic acid such as disclosed by U.S. Pat. No. 5,688,869, which has been incorporated herein by reference. It has also been found that numerous metal cation neutralized, high acid ionomeric resins can be obtained by reacting a high acid polymer (i.e., a polymer containing greater than 16% by weight acid, preferably, from about 17 to about 25% by weight acid and, more preferably, about 20% by weight percent acid) with a metal cation salt capable of ionizing or neutralizing the polymer to a desired extent (for example, from about 10 to 90%).

Such a copolymer can be made up of greater than 16% by weight of an alpha, beta-unsaturated carboxylic acid and an alpha olefin. Optionally, a softening comonomer can be included in the copolymer. Generally, the alpha olefin has from 2 to 10 carbon atoms and, preferably, is ethylene. Preferably, the unsaturated carboxylic acid is a carboxylic acid having from about 3 to 8 carbon atoms. Examples of such acids include acrylic acid, methacrylic acid, ethacrylic acid, chloroacrylic acid, crotonic acid, maleic acid, fumaric acid and itaconic acid with acrylic acid being preferred.

A softening comonomer can be optionally included in the boundary layer 14 of a golf ball as described herein. The softening comonomer can be selected from the group consisting of vinyl esters of aliphatic carboxylic acids having 2 to 10 carbon atoms, vinyl ethers having alkyl groups that contain 1 to 10 carbon atoms and alkyl acrylates or methacrylates in which the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate or the like.

Examples of a number of copolymers suitable for use in a thermoplastic material of the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate terpolymer, an ethylene/acrylic acid/vinyl alcohol terpolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Boundary layer 14 compositions may also include low acid ionomeric resins such as those developed and sold by DuPont under the trade name Suryln™ and ExxonMobil under the trade names Escor™ and Iotek™ as well as any blends thereof.

Another embodiment of a boundary layer 14 of a golf ball can comprise non-ionomeric thermoplastic material or thermoset materials. Suitable non-ionomeric materials include, but are not limited to, metallocene-catalyzed polyolefins or polyamides, metallocene-catalyzed polyamide/ionomeric resin blends, polyphenylene ether/ionomeric resin blends, etc., which preferably have a Shore D hardness of at least 60 (or a Shore C hardness of at least about 90) and a flex modulus of greater than about 30,000 psi, preferably, greater than about 50,000 psi, or other hardness and flex modulus values that are comparable to the properties of the ionomeric resins described above. Other suitable materials include, but are not limited to, thermoplastic or thermosetting polyurethanes, thermoplastic block polyesters (for example, a polyester elastomer such as that sold by DuPont under the trade name Hytrel™), or thermoplastic block polyamides (for example, a polyether amide such as that sold by Elf Atochem S.A. under the trade name Pebex™, a blend of two or more non-ionomeric thermoplastic elastomers, or a blend of one or more ionomeric resins and one or more non-ionomeric thermoplastic elastomers. Such materials can be blended with the ionomeric resins described above in order to reduce overall golf ball manufacturing costs.

Additional materials suitable for use in the boundary layer 14 or cover layer 16 of a golf ball as set forth herein include polyurethanes, which are described in more detail below.

In one embodiment, the cover layer 16 is comprised of a relatively soft, low flex modulus (about 500 to about 50,000 psi, preferably about 1,000 to about 25,000 psi, and more preferably about 5,000 to about 20,000 psi) material or blend of materials. Preferably, the cover layer 16 comprises a polyurethane, a polyurea, a blend of two or more polyurethanes/polyureas or a blend of one or more ionomeric resins or non-ionomeric thermoplastic materials with a polyurethane/polyurea. More preferably, the cover layer comprises a thermoplastic polyurethane or a reaction injection molded polyurethane/polyurea as described in more detail below.

The cover layer 16 preferably has a thickness in the range of 0.005 to about 0.15 inch, more preferably about 0.010 to about 0.050 inch and most preferably 0.015 to 0.025 inch. In one embodiment, the cover layer 14 has a Shore D hardness of 60 or less (or a Shore C hardness less than 90) and more preferably 55 or less (or a Shore C hardness of about 80 or less). In another preferred embodiment, the cover layer 16 is comparatively harder than the boundary layer 14.

In one preferred embodiment, the cover layer 16 comprises a polyurethane, a polyurea or a blend of polyurethanes/polyureas. Polyurethanes are polymers that are used to form a broad range of products. These polymers are generally formed by mixing two primary ingredients during processing. For the most commonly used polyurethanes, the two primary ingredients are a polyisocyanate (for example, 4,4'-diphenylmethane diisocyanate monomer, MDI, toluene diisocyanate, TDI, or derivatives thereof) and a polyol (for example, a polyester polyol or a polyether polyol).

A wide range of combinations of polyisocyanates and polyols (as well as other ingredients) are available for yielding polyurethanes such as described above. Furthermore, the properties of polyurethanes can be controlled by the types of ingredients used. For example, a polyurethane can be a thermoset type (a cross-linked molecular structure that is generally not flowable with heat) or thermoplastic type (a linear molecular structure that is generally flowable with heat).

Cross-linking of a thermoset polyurethane can occur between isocyanate groups (NCO) and the hydroxyl end-groups of polyols. Cross-linking will also occur between $NH_2$ groups of the amines and NCO groups of the isocyanates to form a polyurea. Additionally, the characteristics of such polyurethanes as described above can also be controlled by different types of reactive chemicals and processing parameters. For example, catalysts can be used to control polymerization rates. Depending on the processing method employed, polymerization rates can be very quick (as in the case for some reaction injection molding, RIM, systems) or may be on the order of several hours (as in several coating systems such as a cast system). Consequently, a great variety of polyurethanes are suitable for different end-uses.

Polyurethanes are typically classified as thermosetting or thermoplastic materials. A polyurethane becomes irreversibly "set" when a polyurethane prepolymer is cross-linked with a polyfunctional curing agent such as a polyamine or a polyol. The prepolymer typically is made from polyether or polyester. A prepolymer is typically an isocyanate-terminated polymer that is produced by reacting an isocyanate with a moiety that has active hydrogen groups such as a polyester and/or polyether polyol. For example, the moiety can be a hydroxyl group. Diisocyanate polyethers are the preferred polyurethanes set forth herein because of their water resistance.

The physical properties of thermoset polyurethanes are controlled substantially by the degree of cross-linking and by the content of hard and soft segments. Tightly cross-linked polyurethanes are fairly rigid and strong. A lower amount of cross-linking results in materials that are flexible and resilient. Thermoplastic polyurethanes have some cross-linking, although such cross-linking is primarily by physical means, for example, hydrogen bonding. Cross-linking bonds of a thermoplastic polyurethane can be reversibly broken by increasing temperatures such as during molding or extrusion.

In this regard, thermoplastic polyurethanes can be injection molded and extruded as a sheet or blow film. Thermoplastic polyurethanes can be used up to about 400° F. and are available in a wide range of hardnesses.

Polyurethane materials suitable for use with the present invention may be formed by the reaction of a polyisocyanate, a polyol and, optionally, one or more polymer chain extenders. The polyol component can include any suitable polyether or polyester polyol. Additionally, in an alternative embodiment, the polyol component is polybutadiene diol. The polymer chain extenders include, but are not limited to, diols, triols and amine extenders. Any suitable polyisocyanate may be used to form a polyurethane as set forth herein. The polyisocyanate is preferably selected from the group of diisocyanates including, but not limited to, MDI, 2,4-TDI, m-xylylene diisocyanate (XDI), methylene bis-(4-cyclohexyl isocyanate) (HMDI), hexamethylene diisocyanate (HDI), naphthalene-1,5,-diisocyanate (NDI), 3,3'-dimethyl-4,4'-biphenyl diisocyanate (TODI), 1,4-diisocyanate benzene (PPDI), phenylene-1,4-diisocyanate and 2,2,4- or 2,4,4-trimethyl hexamethylene diisocyanate (TMDI). Other less preferred diisocyanates include, but are not limited to, isophorone diisocyanate (IPDI), 1,4-cyclohexyl diisocyanate (CHDI), diphenylether-4,4'-diisocyanate, p,p'-diphenyl diisocyanate, lysine diisocyanate (LDI), 1,3-bis (isocyanato methyl) cyclohexane and polymethylene polyphenyl isocyanate (PMDI).

One additional polyurethane component that can also be used incorporates meta-tetramethylxylylene diisocyanate (TMXDI) aliphatic isocyanate. Polyurethanes based on TMXDI aliphatic isocyanate can provide improved gloss retention UV light stability, thermal stability and hydrolytic stability. Additionally, TMXDI aliphatic isocyanate has demonstrated favorable toxicological properties. Furthermore, given that TMXDI aliphatic isocyanate has a low viscosity, it is usable with a wider range of diols (to polyurethane) and diamines (to polyureas). If TMXDI aliphatic isocyanate is used, it typically (although not necessarily) can be added as a direct replacement for some or all of the other aliphatic isocyanates. Because of the slow reactivity of TMXDI aliphatic isocyanate, it may be useful or necessary to use catalysts in order to achieve practical demolding times. Hardness, tensile strength and elongation can be adjusted by adding further materials to such a polyurethane component.

For a soft cover layer 16 preferably comprises a polyurethane with a Shore D hardness of from about 10 to about 55 (a Shore C hardness of about 15 to about 75), more preferably, from about 25 to about 55 (a Shore C hardness of about 40 to about 75) and, most preferably, from about 30 to about 55 (a Shore C hardness of about 45 to about 75). Alternatively, for a hard cover layer 16 a Shore D hardness should be from about 20 to about 90, preferably, from about 30 to about 80 and, more preferably, from about 40 to about 70.

The polyurethane material preferably has a flex modulus from about 1 to about 310 Kpsi, more preferably, from about 3 to about 100 Kpsi and most preferably from about 3 to about 40 Kpsi for a soft cover layer. Alternatively, for a hard cover layer 14 the flex modulus should be about 40 to 90 Kpsi.

Non-limiting examples of a polyurethane suitable for use in the cover layer 16 (or boundary layer 14) include a thermoplastic polyester polyurethane such as sold by Bayer Corporation under the trade name Texin™ (for example, Texin™ DP7-1097 and Texin™ 285) and by B.F. Goodrich under the trade name Estane™ (for example, Estane™ X-4517). The thermoplastic polyurethane material may be blended with a soft ionomeric resin or other non-ionomer. For example, polyamides blend well with soft ionomeric resins.

Other soft, relatively low modulus non-ionomeric thermoplastic or thermoset polyurethane materials may also be utilized so as long as the materials can produce the desired playability and durability characteristics. These materials include, but are not limited to, thermoplastic polyurethanes such as Pellethane™ as sold by Dow Chemical Company and non-ionomeric thermoset polyurethanes such as disclosed in U.S. Pat. No. 5,334,673, which is incorporated herein by reference.

Typically, there are two classes of thermoplastic polyurethane materials, namely, aliphatic polyurethanes and aromatic polyurethanes. Aliphatic polyurethanes are produced from a polyol or polyols and aliphatic isocyanates such as $H_{12}MDI$ or HDI. Aromatic polyurethanes are produced from a polyol or polyols and aromatic isocyanates such as MDI or TDI. Thermoplastic polyurethane materials may also be produced from a blend of both aliphatic and aromatic polyurethanes such as a blend of HDI and TDI with a polyol or polyols.

Generally, aliphatic thermoplastic polyurethanes are light-fast meaning that they do not yellow appreciably upon exposure to ultraviolet (UV) light. Conversely, aromatic thermoplastic polyurethanes tend to yellow upon exposure to UV light. One method of stopping the yellowing of aromatic polyurethanes is to paint the outer surface of a finished golf ball comprising such a polyurethane with a coating containing a pigment, such as titanium dioxide, so that the UV light is prevented from reaching the surface of the ball. Another method is to add UV absorbers, optical brighteners and stabilizers to a clear coating(s) on the outer cover of the golf ball as well as to the thermoplastic polyurethane material itself. By adding UV absorbers and stabilizers to the thermoplastic polyurethane and the golf ball coatings, aromatic polyurethanes can be effectively used in the outer cover layer of a ball. This result is advantageous as aromatic polyurethanes typically have better scuff resistance characteristics and cost less than aliphatic polyurethanes.

Other suitable polyurethane materials for use golf balls as set forth herein include reaction injection molded ("RIM") polyurethanes. RIM is a process by which highly reactive liquids are injected into a mold and mixed (usually by impingement and/or mechanical mixing in an in-line device such as a "peanut mixer"). The reactive liquids polymerize primarily in the mold to form a coherent, one-piece molded article. A RIM process usually involves a rapid polymerization reaction between one or more reactive components (such as a polyether or polyester polyol, polyamine or other material with an active hydrogen) and one or more isocyanate containing constituents. Often the reaction occurs in the presence of a catalyst. The reactive liquids are stored in separate tanks prior to molding and may be first mixed in a mix head, which is upstream of the mold. After mixing, the liquids can be injected into the mold. The liquid streams are metered in a desired weight-to-weight ratio and fed into an impingement mix head, with mixing occurring under high pressure, for example, 1,500 to 3,000 psi. The liquid streams impinge upon each other in the mixing chamber of the mix head and the resulting mixture is injected into the mold. One of the liquid streams typically contains a catalyst for the polymerization reaction. The constituent liquids react rapidly after mixing to gel and form polyurethane polymers. Polyureas, epoxies and various unsaturated polyesters also can be molded by RIM processes. Further descriptions of suitable RIM systems are disclosed in U.S. Pat. No. 6,663,508 from which pertinent parts are hereby incorporated by reference.

Non-limiting examples of suitable RIM materials for use as set forth herein are Bayflex™, Baydur™ GS and Prism™ materials sold by Bayer Corporation. Spectrim™ RIM materials from Dow Chemical Company including Spectrim™ MM 373-A (isocyanate) and 373-B (polyol) can also be used. In addition, Elastolit™ SR RIM materials from BASF Corporation can also be used. Preferred RIM materials include Bayflex™ MP-10000, MP-7500 and 110-50 (filled or unfilled). Further preferred examples are polyols, polyamines and isocyanates formed by processes that recycle polyurethanes and polyureas. Additionally, such processes may be modified by incorporating a butadiene component in a diol agent.

Another preferred embodiment is a golf ball in which at least one of the boundary layer 14 and/or the cover layer 16 comprise a fast-chemical-reaction-produced component. This component comprises at least one material selected from the group consisting of polyurethane, polyurea, polyurethane ionomeric resin, epoxy, and unsaturated polyesters, and preferably comprises polyurethane, polyurea or a blend comprising polyurethanes and/or other polymers. A particularly preferred form of the invention is a golf ball with a cover comprising polyurethane or a polyurethane blend.

Polyol components typically contain additives such as stabilizers, flow modifiers, catalysts, combustion modifiers, blowing agents, fillers, pigments, optical brighteners and release agents to modify physical characteristics of the golf ball cover. Also, polyurethane/polyurea constituent molecules derived from recycled polyurethane can be added to the polyol component.

The surface geometry of a golf ball 10 is preferably a conventional dimple pattern such as disclosed in U.S. Pat. No. 6,213,898 from which pertinent parts are hereby incorporated by reference. Alternatively, the surface geometry of the golf ball 10 may have a non-dimple pattern such as disclosed in U.S. Pat. No. 6,290,615 from which pertinent parts are hereby incorporated by reference.

From the foregoing it is believed that those skilled in the pertinent art will recognize the meritorious advancement of this invention and will readily understand that while the present invention has been described in association with a preferred embodiment thereof and other embodiments illustrated in the accompanying drawings, numerous changes, modifications and substitutions of equivalents may be made therein without departing from the spirit and scope of this invention, which is intended to be unlimited by the foregoing except as may appear in the following appended claims. Therefore, the embodiments of the invention in which an exclusive property or privilege is claimed are defined in the following appended claims.

The invention claimed is:

1. A thermoplastic material consisting essentially of:
   approximately 50 parts by weight of a first copolymer comprising an alpha olefin, an alpha, beta-unsaturated carboxylic acid and a softening comonomer;
   approximately 50 parts by weight of a second copolymer comprising a metallocene-catalyzed alpha olefin and a softening comonomer;
   11 parts by weight magnesium hydroxide; and
   approximately 66 parts by weight of oleic acid;
   wherein the thermoplastic material is 100% neutralized.

2. The thermoplastic material according to claim 1, wherein, in the first copolymer, the softening comonomer is an alkyl acrylate or an alkyl methacrylate.

3. The thermoplastic material according to claim 1, wherein, in the second copolymer, the softening comonomer is an alpha olefin.

4. The thermoplastic material according to claim 3, wherein, in the second copolymer, the alpha olefin is selected from the group consisting of butene, hexene, octene and 4-methyl-1-pentene.

\* \* \* \* \*